(12) United States Patent
Lattrel et al.

(10) Patent No.: US 11,301,028 B2
(45) Date of Patent: Apr. 12, 2022

(54) TIME-BASED AND TEMPERATURE-BASED DEVICE THERMAL MITIGATION

(71) Applicant: Motorola Mobility LLC, Chicago, IL (US)

(72) Inventors: Ryan Andrew Lattrel, Chicago, IL (US); Martinho Rabindra Pais, North Barrington, IL (US)

(73) Assignee: Motorola Mobility LLC, Chicago, IL (US)

( * ) Notice: Subject to any disclaimer, the term of this patent is extended or adjusted under 35 U.S.C. 154(b) by 44 days.

(21) Appl. No.: 16/911,043

(22) Filed: Jun. 24, 2020

(65) Prior Publication Data

US 2021/0405735 A1    Dec. 30, 2021

(51) Int. Cl.
*G06F 1/3296* (2019.01)
*G06F 1/20* (2006.01)
*G06F 1/3206* (2019.01)
*G06F 1/3287* (2019.01)

(52) U.S. Cl.
CPC ............ *G06F 1/3296* (2013.01); *G06F 1/206* (2013.01); *G06F 1/3206* (2013.01); *G06F 1/3287* (2013.01)

(58) Field of Classification Search
CPC .................................................. Y02D 10/00
USPC ........................................................ 713/320
See application file for complete search history.

(56) References Cited

U.S. PATENT DOCUMENTS

| | | | |
|---|---|---|---|
| 2012/0179416 A1* | 7/2012 | Anderson | G06F 1/3296 |
| | | | 702/130 |
| 2014/0006818 A1* | 1/2014 | Doshi | G06F 1/3203 |
| | | | 713/320 |
| 2016/0246346 A1* | 8/2016 | Sugumar | G06F 1/206 |
| 2016/0357232 A1* | 12/2016 | Kalyanasundaram | G06F 1/329 |
| 2017/0099204 A1* | 4/2017 | Park | G06F 1/206 |
| 2021/0018966 A1* | 1/2021 | Stanley | G06F 1/3203 |
| 2021/0168838 A1* | 6/2021 | Kothiwale | H04W 72/048 |

* cited by examiner

*Primary Examiner* — Suresh Suryawanshi
(74) *Attorney, Agent, or Firm* — FIG. 1 Patents

(57) ABSTRACT

A device includes a thermal mitigation system that operates to reduce performance of a component of the device to prevent the device from getting too hot. The system uses a combination of a time-based technique and a temperature-based technique to perform thermal mitigation. The time-based technique refers to using an indication of the device usage as well as the amount of current drawn by the device at any given time to predict an amount of time that the device is to run in a non-reduced performance mode before reaching a target temperature threshold, and an amount of time for the device to run in a reduced performance mode to cool down. The temperature-based technique refers to monitoring the temperature of the device (or a component of the device) and powering off the device in response to detecting that a monitored temperature exceeds a critical threshold temperature.

20 Claims, 5 Drawing Sheets

TIME-BASED AND TEMPERATURE-BASED DEVICE THERMAL MITIGATION

BACKGROUND

As technology has advanced computing devices have become increasingly powerful, resulting in computing devices being able to support a wide variety of functionality. This wide variety of functionality can include, for example, high-resolution video playback, high-resolution video games, data transfer at high data rates (e.g., 5-50 gigabits per second), and so forth. This functionality is enjoyed by many users but is not without is problems. One such problem is that use of many of these functionalities, particularly concurrently, can lead to the computing device becoming too hot. If the computing device becomes too hot the computing device typically shuts down for a while to cool down, leaving users confused and frustrated with their computing devices because they are unable to use them.

BRIEF DESCRIPTION OF THE DRAWINGS

Embodiments of time-based and temperature-based device thermal mitigation are described with reference to the following drawings. The same numbers are used throughout the drawings to reference like features and components.

DETAILED DESCRIPTION

Figure 1:
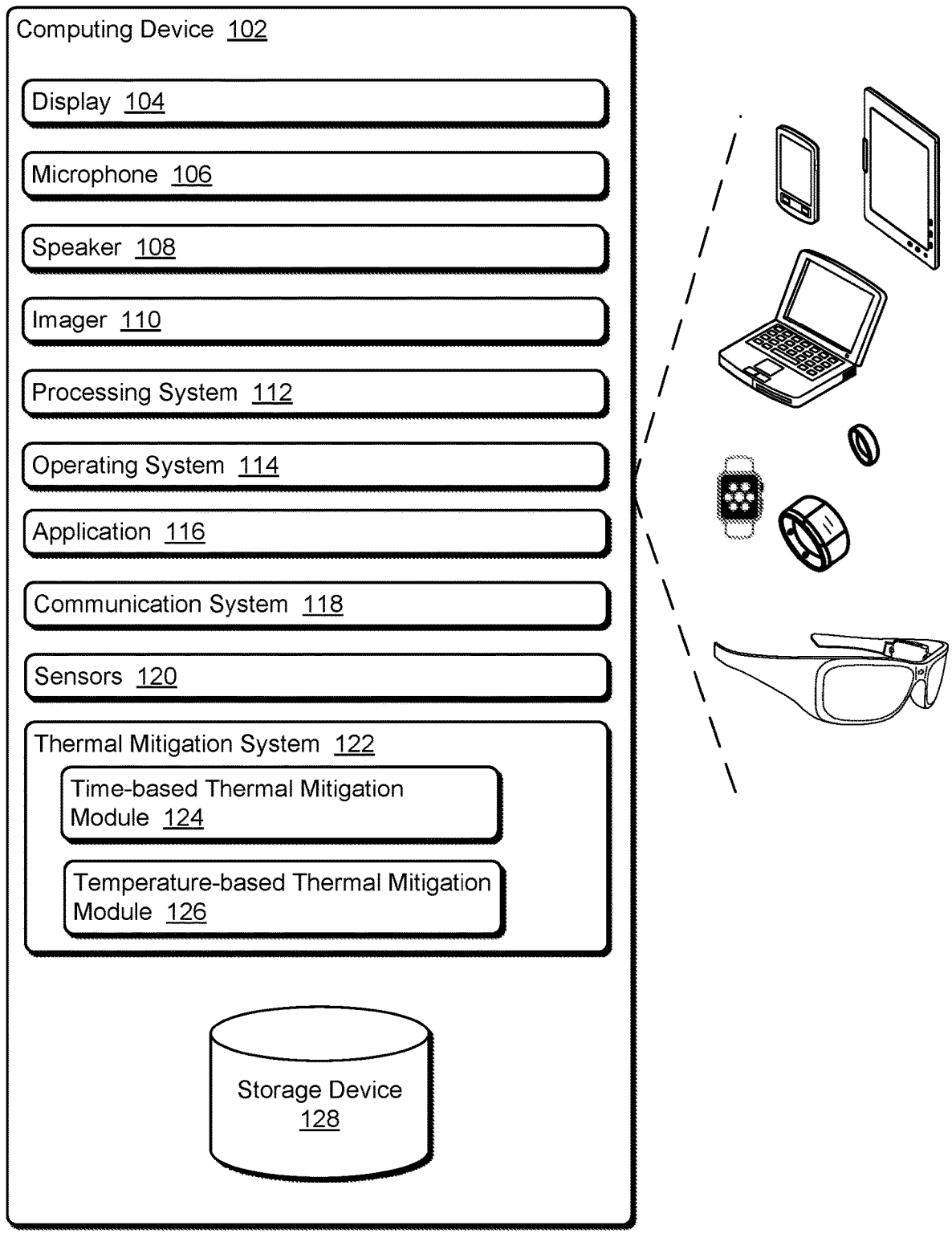
FIG. 1 illustrates an example computing device implementing the techniques discussed herein.

Time-based and temperature-based device thermal mitigation is discussed herein. Generally, a device includes a thermal mitigation system that operates to reduce performance of one or more components of the device to prevent the device from getting too hot, also referred to as thermal mitigation. The thermal mitigation system uses a combination of a time-based technique and a temperature-based technique to perform thermal mitigation. The time-based technique refers to monitoring the usage of the device as well as the amount of current drawn by the device at any given time. The device usage and current draw are used to predict an amount of time that the device can run before reaching a target temperature threshold. In response to the predicted amount of time elapsing, the performance of one or more components in the device is reduced to prevent the device from getting too hot. The performance of a component can be reduced in various manners depending, at least in part, on the type of component. For example, video resolution can be reduced, processor speed can be reduced, data transfer rate can be reduced, and so forth.

The thermal mitigation system further uses the device usage and current draw to predict an amount of time that the device is to be given to cool down. After reducing the performance of one or more components, the thermal mitigation system waits the predicted amount of time that the device is to be given to cool down, and then reinstates the previous performance of the one or more components (e.g., undoes or reverses any performance reduction of the one or more components). This allows the thermal mitigation system to pulse the performance of the one or more components, allowing them to operate at an initial (e.g., full) performance level until the predicted amount of time that the device can run before reaching the target temperature threshold elapses, then operating at a reduced performance level until the predicted amount of time that the device is to be given to cool down elapses.

The temperature-based technique refers to monitoring the temperature of the device itself (e.g., the external surface temperature of the device) as well as the temperatures of one or more components within the device. In response to detecting that a monitored temperature exceeds a critical threshold temperature, the device is powered off or shut down in order to prevent potential damage to the device.

In contrast to techniques that only perform temperature-based thermal mitigation, the techniques discussed herein improve the operation of the device by also performing time-based thermal mitigation. By predicting when the device will reach a temperature threshold, the thermal mitigation system can reduce the performance of one or more components of the device prior to the device reaching the target temperature threshold. Furthermore, by predicting the amount of time the device is to be given to cool down, the performance of the one or more components can be reduced only as long as needed for the device to cool down. This can allow the device to run longer, alternating between the initial or full performance state and the reduced performance state, prior to reaching (or potentially not reaching) the critical temperature threshold. Additionally, this time-based thermal mitigation reduces the frequency with which the thermal mitigation system checks the temperature of the device, freeing resources (e.g., of a processing system) to perform other tasks.

FIG. 1 illustrates an example computing device 102 implementing the techniques discussed herein. The computing device 102 can be, or include, many different types of computing or electronic devices. For example, the computing device 102 can be a smartphone or other wireless phone, a notebook computer (e.g., notebook or ultrabook), a laptop computer, a camera (e.g., compact or single-lens reflex), a wearable device (e.g., a smartwatch, a ring or other jewelry, augmented reality headsets or glasses, virtual reality headsets or glasses), a tablet or phablet computer, a personal media player, a personal navigating device (e.g., global positioning system), an entertainment device (e.g., a gaming console, a portable gaming device, a streaming media player, a digital video recorder, a music or other audio playback device), a video camera, an Internet of Things (IoT) device, a fitness tracker, a smart TV, an automotive computer, and so forth.

The computing device 102 includes a display 104, a microphone 106, a speaker 108, and an imager 110. The display 104 can be configured as any suitable type of display, such as an organic light-emitting diode (OLED) display, active matrix OLED display, liquid crystal display (LCD), in-plane shifting LCD, projector, and so forth. The microphone 106 can be configured as any suitable type of microphone incorporating a transducer that converts sound into an electrical signal, such as a dynamic microphone, a condenser microphone, a piezoelectric microphone, and so forth. The speaker 108 can be configured as any suitable type of speaker incorporating a transducer that converts an electrical signal into sound, such as a dynamic loudspeaker using a diaphragm, a piezoelectric speaker, non-diaphragm based speakers, and so forth.

The imager 110 can be configured as any suitable type of image capture component that captures images digitally using any of a variety of different technologies, such as a charge-coupled device (CCD) sensor, a complementary metal-oxide-semiconductor (CMOS) sensor, combinations thereof, and so forth. The imager 110 can include a single sensor and lens, or alternatively multiple sensors and multiple lenses. The imager 110 can capture still images as well as video.

Although illustrated as part of the computing device 102, it should be noted that one or more of the display 104, the microphone 106, the speaker 108, and the imager 110 can be implemented separately from the computing device 102. In such situations, the computing device 102 can communicate with the display 104, the microphone 106, the speaker 108, or the imager 110 via any of a variety of wired (e.g., Universal Serial Bus (USB), IEEE 1394, High-Definition Multimedia Interface (HDMI)) or wireless (e.g., Wi-Fi, Bluetooth, infrared (IR)) connections. For example, the display 104 may be separate from the computing device 102 and the computing device 102 (e.g., a streaming media player) communicates with the display 104 via an HDMI cable. By way of another example, the microphone 106 may be separate from the computing device 102 (e.g., the computing device 102 may be a television and the microphone 106 may be implemented in a remote control device) and voice inputs received by the microphone 106 are communicated to the computing device 102 via an IR or radio frequency wireless connection.

The computing device 102 also includes a processing system 112 that includes one or more processors, each of which can include one or more cores. The processing system 112 is coupled with, and may implement functionalities of, any other components or modules of the computing device 102 that are described herein. In one or more embodiments, the processing system 112 includes a single processor having a single core. Alternatively, the processing system 112 includes a single processor having multiple cores or multiple processors (each having one or more cores).

The computing device 102 also includes an operating system 114. The operating system 114 manages hardware, software, and firmware resources in the computing device 102. The operating system 114 manages one or more applications 116 running on the computing device 102 and operates as an interface between applications 116 and hardware components of the computing device 102.

The computing device 102 also includes a communication system 118. The communication system 118 manages communication with various other devices, including establishing voice calls, sending electronic communications to and receiving electronic communications from other devices, and so forth. The content of these electronic communications and the recipients of these electronic communications is managed by an application 116 or the operating system 114. This communication can take various forms, such as voice calls (e.g., over a cellular system, public switched telephone network (PSTN), network (e.g., using voice over Internet Protocol (VoIP), etc.), short messaging service (SMS) messages, multimedia messaging service (MMS) messages, email, group based chat messaging system, and so forth. This communication can be carried out over a network, which can be any of a variety of different networks, including the Internet, a local area network (LAN), a public telephone network, a cellular network (e.g., a third generation (3G) network, a fourth generation (4G) network, a fifth generation (5G) network), an intranet, other public or proprietary networks, combinations thereof, and so forth.

The computing device 102 also includes sensors 120. Sensors can include various types of sensor, such as thermal sensors that detect the temperature at various places of the computing device 102, current sensors that detect an amount of current being drawn from a power source by the various components of the computing device 102, and so forth.

The computing device 102 also includes a thermal mitigation system 122. The thermal mitigation system 122 includes a time-based thermal mitigation module 124 and a temperature-based thermal mitigation module 126. The time-based thermal mitigation module 124 implements functionality to reduce temperature of the computing device 102 based on an amount of time the computing device 102 is predicted to take to heat up or cool down. The temperature-based thermal mitigation module 126 implements functionality to reduce temperature of the computing device 102 based on a current temperature of the computing device 102.

The thermal mitigation system 122 can be implemented in a variety of different manners. For example, the thermal mitigation system 122 can be implemented as multiple instructions stored on computer-readable storage media and that can be executed by the processing system 112 (e.g., as an application 116 or as part of the operating system 114). Additionally or alternatively, the thermal mitigation system 122 can be implemented at least in part in hardware (e.g., as an application-specific integrated circuit (ASIC), a field-programmable gate array (FPGA), and so forth).

The computing device 102 also includes a storage device 128. The storage device 128 can be implemented using any of a variety of storage technologies, such as magnetic disk, optical disc, Flash or other solid state memory, and so forth. The storage device 128 can store various program instructions and data for any one or more of the operating system 114, application 116, and the thermal mitigation system 122, audio captured by the microphone 106, images or video captured by the imager 110, and so forth.

Figure 2:
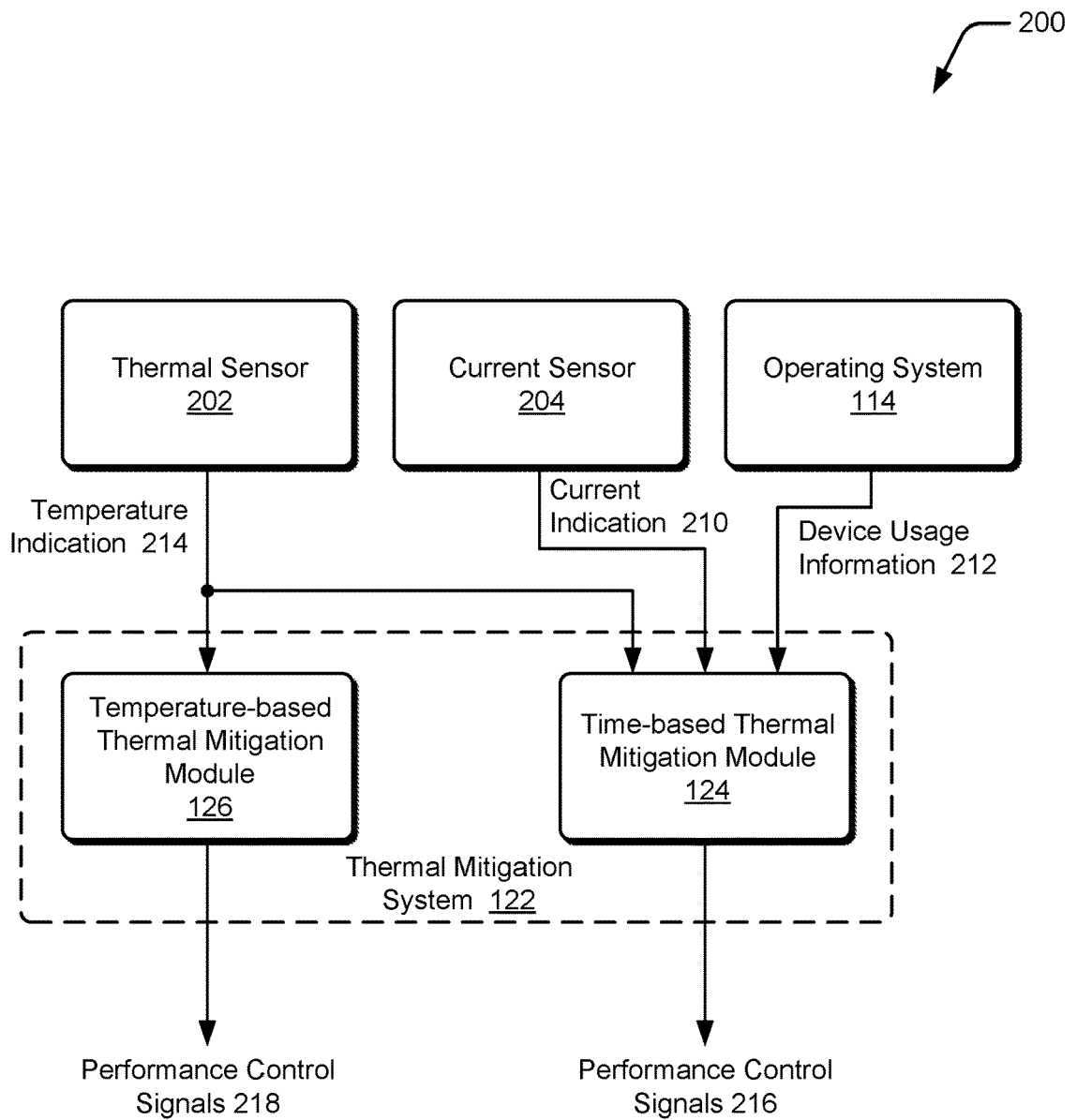
FIG. 2 illustrates an example system implementing the techniques discussed herein.

FIG. 2 illustrates an example system 200 implementing the techniques discussed herein. The system 200 includes a thermal sensor 202, a current sensor 204, the operating system 114, the time-based thermal mitigation module 124, and the temperature-based thermal mitigation module 126. The thermal sensor 202 is one of the sensors 120 of FIG. 1. The thermal sensor 202 detects the temperature at various places of the computing device 102. The thermal sensor 202 can be implemented using any of a variety of public or proprietary temperature sensing techniques. The thermal sensor 202 can detect the temperature of the interior of the computing device 102 (e.g., within the housing of the computing device 102), the temperature of the exterior of the computing device 102 (e.g., the surface of the computing device 102 that users can touch), the temperature of individual components (e.g., the display 104, the microphone 106, the speaker 108, the imager 110, the processing system 112, the communication system 118), and so forth.

Although a single thermal sensor 202 is illustrated in FIG. 2, it should be noted that the system 200 can include multiple sensors each of which can detect the temperature at different locations. For example, one thermal sensor 202 can detect the temperature of the exterior of the computing device 102 and another thermal sensor 202 can detect the temperature of a graphics processing unit (GPU) controlling the display 104.

The current sensor 204 detects the amount of current being drawn by the computing device 102 from a power source for the computing device 102. The power source supplying power to the computing device 102 can be implemented in various manners, such as a flexible strip battery, a rechargeable battery, a charged super-capacitor, or any other type of active or passive power source. The detected amount of current being drawn is the amount of current being drawn in order to power all of the components of the computing device 102.

Additionally or alternatively, a current sensor 204 can detect or determine the amount of current being drawn by an individual component of the computing device 102, such as the display 104, the speaker 108, the imager 110, and so forth. The state of operation of these components is known (e.g., they can be software controlled), and the characteristics of the components (e.g., the current drawn at various brightness settings of the display 104, the current drawn at various volume settings of the speaker 108, the current drawn at various capture settings of the imager 110) are known. Accordingly, the current sensor 204 can readily detect or determine the amount of current being drawn by an individual component based on the current state of operation of the component. In such situations the current sensor 204 can, for example, be implemented in software or firmware.

The time-based thermal mitigation module 124 receives current indication 210 from the current sensor 204, device usage information 212 from the operating system 114, and temperature indication 214 from the thermal sensor 202. Additionally or alternatively, the device usage information 212 can be received from one or more applications 116. The current indication 210, device usage information 212, and temperature indication 214 can be received at regular or irregular intervals, such as approximately every millisecond or every 10 milliseconds. The time-based thermal mitigation module 124 generates a prediction of an amount of time that the computing device 102 can operate, assuming the current indication 210 and the device usage information 212 at the present time remains approximately the same, before reaching a target temperature threshold. The target temperature threshold refers to a temperature at which the thermal mitigation system 122 reduces the performance of one or more components of the computing device 102 (e.g., so as not to exceed the target temperature threshold). This target temperature threshold can be fixed (e.g., 65° Celsius (C)) or variable (e.g., 20° C. higher than the ambient temperature at the present time). The time-based thermal mitigation module 124 also generates a prediction, given one or more performance reduction actions taken, of an amount of time that the computing device 102 will take to cool down.

The time-based thermal mitigation module 124 can predict the amount of time that the computing device 102 can operate before reaching the target temperature threshold in a variety of different manners. In one or more embodiments, various different public or proprietary thermal modeling techniques are used to model the temperature of the computing device 102. The makeup of the computing device 102 is known, including the components in the computing device 102, the performance characteristics of the components in the computing device 102 (e.g., one or more frequencies at which they operate), and the materials that those components are made of. The device usage information 212 is also input to the time-based thermal mitigation module 124. The device usage information 212 indicates how the computing device 102 is currently being used, such as how various processors in the processing system 112 are running (e.g., the frequency at which a processor (or a core of a processor) is running, whether a processor (or a core of a processor) is temporarily shut down), a data transfer rate being used by the communication system 118, a communication standard the communication system 118 is using (e.g., 3G, 4G, or 5G), which applications 116 are running, the resolution that the display 104 is displaying video at, the volume that the speaker 108 is playing back audio at, and so forth.

These thermal modeling techniques model how quickly the computing device 102 heats up and cools down given the makeup of the computing device 102, the temperature indication 214 at the present time, the current indication 210 at the present time, and the device usage information 212 at the present time. The thermal modeling techniques can model how quickly the computing device 102 heats up and cools down based on various different thermal sensors 202. For example, the thermal modeling techniques can model how quickly the external surface of the computing device 102 heats up and cools down, allowing the thermal mitigation system 122 to keep the external surface that the user touches from getting too hot. In one or more embodiments, this modeling is performed during operation of the computing device 102 to determine how quickly the computing device 102 heats up and cools down. Additionally or alternatively, this modeling can have been previously performed and the results stored in a table or other data structure so that the time-based thermal mitigation module 124 can readily look up how quickly the computing device heats up and cools down given the makeup of the computing device 102, the temperature indication 214 at the present time, the current indication 210 at the present time, and the device usage information 212 at the present time. This table or other data structure can optionally be updated at various times, such as in response to over-the-air updates received from a manufacturer or distributor of the computing device 102 after the user has received the computing device 102.

The time-based thermal mitigation module 124 can readily predict the amount of time that the computing device 102 can operate (without reducing performance) until reaching the target temperature threshold given the temperature indication 214 at the present time and, based on the thermal modelling for the computing device 102, how quickly the computing device 102 heats up. For example, if the target temperature threshold is 20° C. higher than the temperature at the present time, and the thermal modeling indicates that the temperature of the computing device 102 will increase 1° C. per second, then the time-based thermal mitigation module 124 predicts that the computing device 102 can operate without reducing performance for 20 seconds.

Similarly, the time-based thermal mitigation module 124 can readily predict the amount of time that the computing device 102 can operate, with reduced performance, until reaching a cool-down temperature threshold given the temperature indication 214 at the present time and, based on the thermal modelling for the computing device 102, how quickly the computing device 102 cools down. For example, if the cool-down temperature threshold is 20° C. lower than the temperature at the present time, and the thermal modeling indicates that the temperature of the computing device 102 will decrease 5° C. per second, then the time-based thermal mitigation module 124 predicts that the computing device 102 can operate, with reduced performance, for 4 seconds until reaching the cool-down temperature threshold. The cool-down temperature threshold can be fixed (e.g., 45° Celsius (C)) or variable (e.g., 20° C. lower than the temperature when the reduced performance begins).

The time-based thermal mitigation module 124 can use these predicted amounts of time for the computing device 102 to heat up to the target temperature threshold and cool to the cool-down temperature threshold to provide performance control signals 216 to the various components of the computing device 102. The performance control signals 216 cause the performance of one or more components of the computing device 102 to change, such as by reducing the frequency at which a processor or processor core is running, reducing a number of processors or processor cores being used, reducing speaker volume, reducing display resolution (e.g., from 4K to 1080p), entering a low power mode, reducing data transfer rate (e.g., signal to a cell tower to reduce the data transfer rate, such as by setting a CQI (Call Quality Information) bit), changing the communication standard the communication system 118 is using (e.g., reducing the communication from higher performance 5G 8CC-64QAM (6.2 gigabits per second) to 1CC-QPSK (0.262 gigabits per second) or to drop down to a lower performance 4G), reducing a battery charging rate, and so forth.

The time-based thermal mitigation module 124 can determine which one or more components to reduce the performance of in a variety of different manners. In one or more embodiments, the time-based thermal mitigation module 124 accesses a list or record of which one or more components to reduce the performance of. For example, the list or record may indicate to reduce the frequency at which a processor or processor core is running, reduce the data transfer rate, and reduce the display resolution. This list or record can be pre-configured in the computing device 102 (e.g., in the thermal mitigation system 122), can be obtained from another device or service, and so forth.

Additionally or alternatively, the time-based thermal mitigation module 124 can determine which one or more components to reduce the performance of based on the device usage information 212. The time-based thermal mitigation module 124 can apply any of a variety of different rules, criteria, or algorithms to the device usage information 212 at the present time to determine which one or more components to reduce the performance of. For example, the device usage information 212 may indicate a resolution of video being played back by the computing device 102, and the time-based thermal mitigation module 124 can determine to reduce the resolution only if the resolution is at its maximum resolution (e.g., if video is being played back at 4k resolution then it is reduced to 1080p resolution, but if the display is capable of playback at 4k resolution and video is being played back at 1080p resolution then the resolution is not reduced). By way of another example, the device usage information 212 may indicate a data transfer rate with a cell tower, and the time-based thermal mitigation module 124 can determine to reduce the data transfer rate if it's greater than a threshold transfer rate (e.g., reduce the data transfer rate while using the same communication standard (e.g., 5G) or changing the communication standard to a lower performance standard (e.g., reduce from 5G to 4G). The data transfer rate can also be reduced using the same communication standard. E.g., using the 5G communication standard data transfers can occur at, for example, 8CC, 4CC, 2CC, 1 CC and also modulations of 64QAM, 16 QAM, QPSK, and so forth. Reducing the number of CCs (component carriers) or the quadrature amplitude modulation (QAM) reduces the data transfer rate.

It should be noted that in some situations the thermal sensor 202 is specific to one or more particular components. In such situations, the time-based thermal mitigation module 124 determines to reduce the performance of those one or more particular components. For example, if the thermal sensor 202 is a sensor that detects or determines the amount of current being drawn by a GPU, then the time-based thermal mitigation module 124 determines to reduce the performance of the GPU (e.g., reduce the display resolution).

As discussed above, the time-based thermal mitigation module 124 can predict the amount of time that the computing device 102 can operate, with reduced performance, until reaching a cool-down temperature threshold. Operating with reduced performance is also referred to as operating in a cool-down mode or a reduced performance mode. In one or more embodiments, the time-based thermal mitigation module 124 keeps the one or more components at the reduced performance until the predicted amount of time to reaching the cool-down temperature threshold has elapsed. In response to the predicted amount of time to reaching the cool-down temperature threshold has elapsed, the time-based thermal mitigation module 124 communicates performance control signals 216 to the one or more components indicating to no longer operate at the reduced performance level. These signals can be, for example, a signal indicating to the one or more components to exit a low power mode (e.g., return to a full power mode). By way of another example, the time-based thermal mitigation module 124 can maintain a record of the performance settings or levels of the one or more components when the time-based thermal mitigation module 124 communicated the performance control signals 216 indicating to reduce performance. The time-based thermal mitigation module 124 can then signal to the one or more components to return to the performance they had just prior to beginning the reduced performance.

The time-based thermal mitigation module 124 can alternate between having the one or more components of the computing device 102 operate in a reduced performance mode and operate in a non-reduced performance mode. The computing device 102 initially operates in the non-reduced performance mode until the time-based thermal mitigation module 124 predicts that the computing device 102 will reach the target temperature threshold. The time-based thermal mitigation module 124 then communicates the performance control signals 216 to have one or more components operate in a reduced performance mode. The computing device 102 continues to operate in this reduced performance mode until the predicted amount of time to reaching the cool-down temperature threshold has elapsed. The computing device 102 then resumes operating in the non-reduced performance mode until the time-based thermal mitigation module 124 predicts that the computing device 102 will again reach the target temperature threshold. The time-based thermal mitigation module 124 keeps repeating this process of switching between operating in the non-reduced performance mode and the reduced performance mode, allowing the temperature sensed by the thermal sensor 202 to remain below the target temperature threshold. This is also referred to as a pulse or pulsed operation due to the temperature repeatedly increasing, then dropping during in the reduced performance mode, then increasing, then dropping again during the next reduced performance mode, and so forth.

Figure 3:
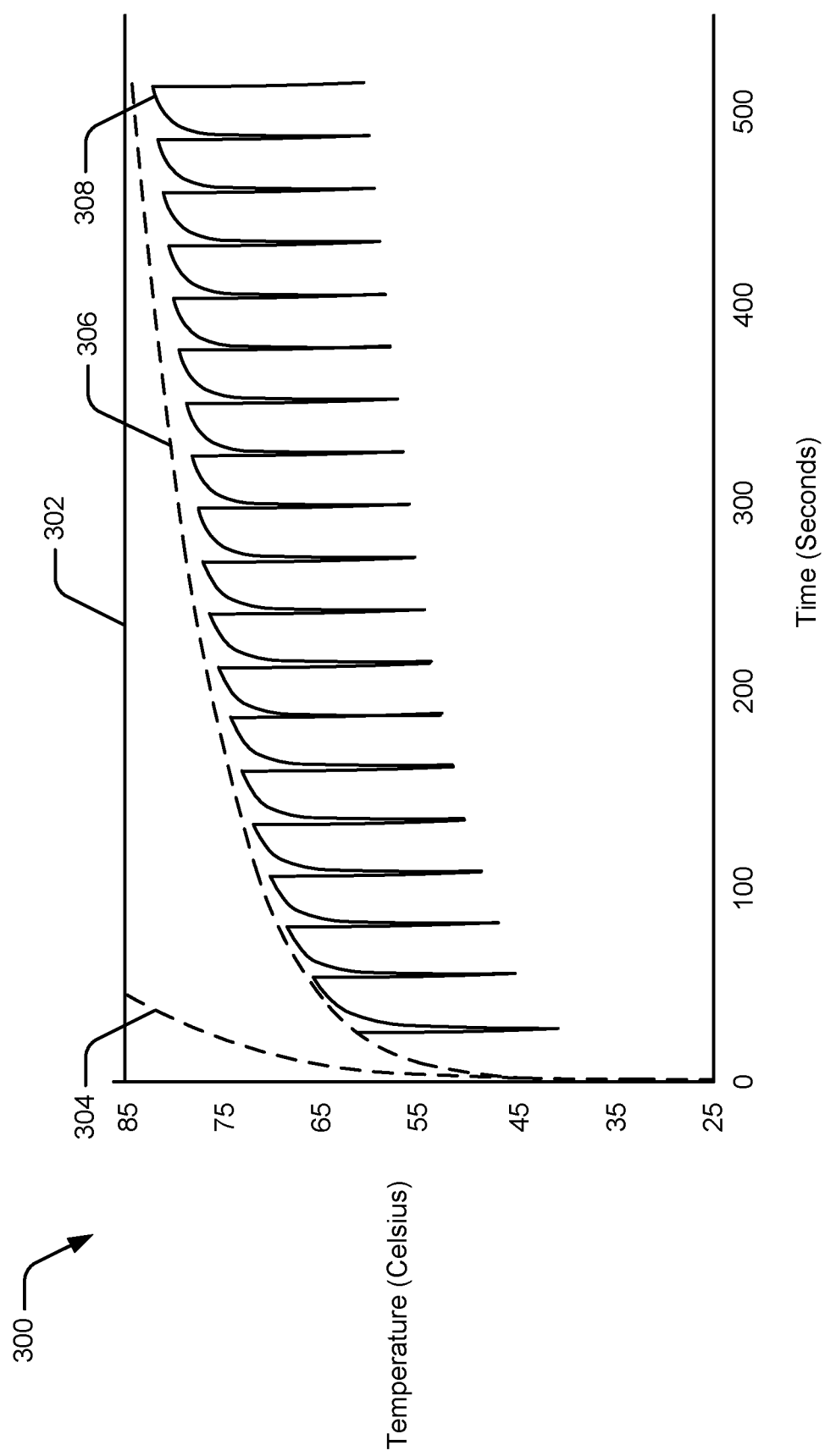
FIG. 3 illustrates an example of the operation of a time-based thermal mitigation module.

FIG. 3 illustrates an example 300 of the operation of the time-based thermal mitigation module 124. The example 300 is a graph of temperature (e.g., as measured by the thermal sensor 202 of FIG. 2) over time. Temperature is in degrees Celsius along the vertical axis and time is in seconds along the horizontal axis. The example 300 assumes that the computing device 102 is drawing a large amount of current, such as by downloading a large amount of data at a high data transfer rate (e.g., using 5G).

A critical temperature threshold 302 is a critical temperature, illustrated as 85° C., that is not to be exceeded. In one or more implementations, this critical temperature threshold 302 is a shutdown threshold and if the critical temperature threshold 302 is exceeded the computing device 102 is immediately powered off or shut down.

A dashed line 304 illustrates operation of the computing device 102 if there is no thermal mitigation. As illustrated, the computing device 102 reaches the critical temperature threshold 302 in approximately 45 seconds.

A dashed line 306 illustrates operation of the computing device 102 if thermal mitigation is used but only based on the temperature of the computing device 102. For example, when a thermal sensor indicates that the computing device 102 is within a threshold number of degrees of the critical temperature threshold 302, the computing device 102 enacts thermal mitigation by reducing the data transfer rate (e.g., using 4G rather than 5G). As illustrated, the computing device 102 reaches the critical temperature threshold 302 in approximately 515 seconds.

A line 308 illustrates operation of the computing device 102 if thermal mitigation is implemented using the time-based techniques discussed herein. As shown, the computing device 102 repeatedly operates in the non-reduced performance mode for an amount of time (e.g., approximately 27-30 seconds) followed by operating in the reduced performance mode for another amount of time (e.g., approximately 3-4 seconds). This allows the computing device 102 to keep operating for a longer amount of time (potentially indefinitely) without reaching the critical temperature threshold 302.

Returning to FIG. 2, it should be noted that once a prediction of the amount of time that the computing device 102 can operate without reducing performance until reaching the target temperature threshold and a prediction of the amount of time to reaching the cool-down temperature have been made, the time-based thermal mitigation module 124 can make determinations of what performance control signals 216 to communicate based on time rather than subsequent temperature indications 214. This allows the thermal mitigation system 122 to reduce the frequency with which temperature indications 214 are received, such as from once every millisecond to once every one or two seconds. This conserves resources in the computing device 102, such as not requiring the thermal sensor 202 to measure the temperature as frequently, not requiring the thermal mitigation system 122 to expend computational resources (which can further increase the temperature of the computing device 102) processing the temperature indication 214 as frequently, and so forth.

In one or more embodiments, the time-based thermal mitigation module 124 continues to generate and use a new prediction of the amount of time that the computing device 102 can operate without reducing performance until reaching the target temperature threshold each time a new temperature indication 214 is received (e.g., every one or two seconds). This allows the time-based thermal mitigation module 124 to account for unanticipated changes in the current indication 210, the device usage information 212, or the temperature indication 214.

Similarly, in one or more embodiments, once the computing device 102 is operating in the reduced performance mode, the time-based thermal mitigation module 124 continues to generate and use a new prediction of the amount of time that the computing device 102 can operate, with reduced performance, until reaching a cool-down temperature threshold each time a new temperature indication 214 is received (e.g., every one or two seconds). This allows the time-based thermal mitigation module 124 to account for unanticipated changes in the current indication 210, the device usage information 212, or the temperature indication 214. Additionally or alternatively, the time-based thermal mitigation module 124 can continue to operate in the reduced performance mode until the previously predicted amount of cool-down time (e.g., the last predicted amount of time prior to entering the reduced performance mode) has elapsed, or temperature indication 214 is at or below the cool-down temperature threshold.

In one or more embodiments, the time-based thermal mitigation module 124 waits to begin predicting the amount of time that the computing device 102 can operate without reduced performance until reaching the target temperature threshold and the amount of time that the computing device 102 can operate with reduced performance until reaching a cool-down temperature threshold until after an asymptote ramp threshold is reached. This asymptote ramp threshold can be set at various levels, such as 55° C. or 60° C. The temperature rise of the computing device 102 is oftentimes highly non-linear, going through a very steep rise at inception and then an asymptotic leveling at the higher end. The asymptote ramp threshold can be set, for example, at a point where the change in temperature changes from being very steep to being asymptotic (e.g., by tracking the temperature indications 214 over time and determining when a line formed by connecting a plot of those temperatures has an angle less than a particular number of degrees, such as 20 degrees). By waiting until the temperature indication 214 indicates that the asymptote ramp threshold has been reached, the time-based thermal mitigation module 124 need not expend resources generating the predictions while the computing device 102 is still heating up quickly.

Furthermore, it should be noted that the time-based thermal mitigation module 124 can predict the amount of time that the computing device 102 can operate without reduced performance until reaching the target temperature threshold and the amount of time that the computing device 102 can operate with reduced performance until reaching a cool-down temperature threshold in response to events other than temperature thresholds. The time-based thermal mitigation module 124 can generate these predictions in response to any of a variety of events that the thermal mitigation system 122 anticipates may result in one or more components of the computing device 102 becoming too hot (e.g., reaching the target temperature threshold).

For example, the device usage information 212 can include an indication that a user has requested to download a large file (e.g., a 100 gigabyte movie). The size of the file can be included in the device usage information 212 or the time-based thermal mitigation module 124 can determine the size (e.g., by checking another device or service, such as via the Internet). Given the data rate at the present time as indicated by the device usage information 212, the time-based thermal mitigation module 124 can readily predict, using the thermal modelling for the computing device 102, during the download how quickly the computing device 102 will heat up when in a non-reduced performance mode and cool-down in a reduced performance mode. The time-based thermal mitigation module 124 can then generate predictions of when to enter the non-reduced performance mode and when to enter the reduced performance mode during download of the movie, and communicate the appropriate performance control signals 216 during the download of the movie. This allows the movie to be downloaded and played back without requiring the movie to be downloaded in its entirety prior to beginning playback, allows the download to proceed during playback (although possibly at different data transfer rates), and prevents the computing device 102 from reaching the target temperature threshold or the critical temperature threshold.

The temperature-based thermal mitigation module 126 receives the temperature indication 214 from the thermal sensor 202 and compares the received temperature indication 214 to a critical temperature threshold. Various components of the computing device 102 (e.g., the processing system 112, the communication system 118, the display 104, a battery, the surface of the computing device 102 that users can touch and so forth) have critical temperatures that are not to be exceeded. Exceeding a critical temperature can have various negative effects, such as damaging the component, causing a fire, injuring the user, and so forth. These critical temperature thresholds corresponding to the thermal sensors 202 can be pre-configured in the computing device 102 (e.g., in the thermal mitigation system 122), can be obtained from another device or service, and so forth.

The temperature-based thermal mitigation module 126 compares the received temperature indication 214 to the critical temperature threshold corresponding to the thermal sensor 202. In response to determining that the temperature indication 214 satisfies the critical temperature threshold (e.g., equals or exceeds the critical temperature threshold), the temperature-based thermal mitigation module 126 communicates one or more performance control signals 218 to power off or shut down the computing device 102. The performance control signals 218 can be communicated to one or more components of the computing device 200, such as the operating system 114 to perform the shutdown, to a power source to immediately terminate power supply to the other components of the computing device 102, and so forth.

It should be noted that, while the time-based thermal mitigation module 124 is generating the predictions, the frequency with which the temperature-based thermal mitigation module 126 compares the temperature indications 214 to the critical temperature threshold can be reduced relative to when the time-based thermal mitigation module 124 is not generating the predictions (e.g., due to the asymptote ramp threshold not being reached), thereby reducing consumption of resources in the computing device 102 (e.g., of the processing system 112). For example, the temperature-based thermal mitigation module 126 may compare the temperature indications 214 to the critical temperature threshold approximately every one millisecond while the time-based thermal mitigation module 124 is not generating the predictions, and approximately every one or two seconds while the time-based thermal mitigation module 124 is generating the predictions. The temperature-based thermal mitigation module 126 can reduce the frequency of the comparison because the predictions made by the time-based thermal mitigation module 124 are expected to keep the computing device 102 from exceeding the target temperature threshold, which is lower than the critical temperature threshold. However, the temperature-based thermal mitigation module 126 continues the comparison at the reduced frequency as a safety backup in the event of a change in use scenario, an inaccurate prediction or malfunction of a component of the computing device 102.

Figure 4:
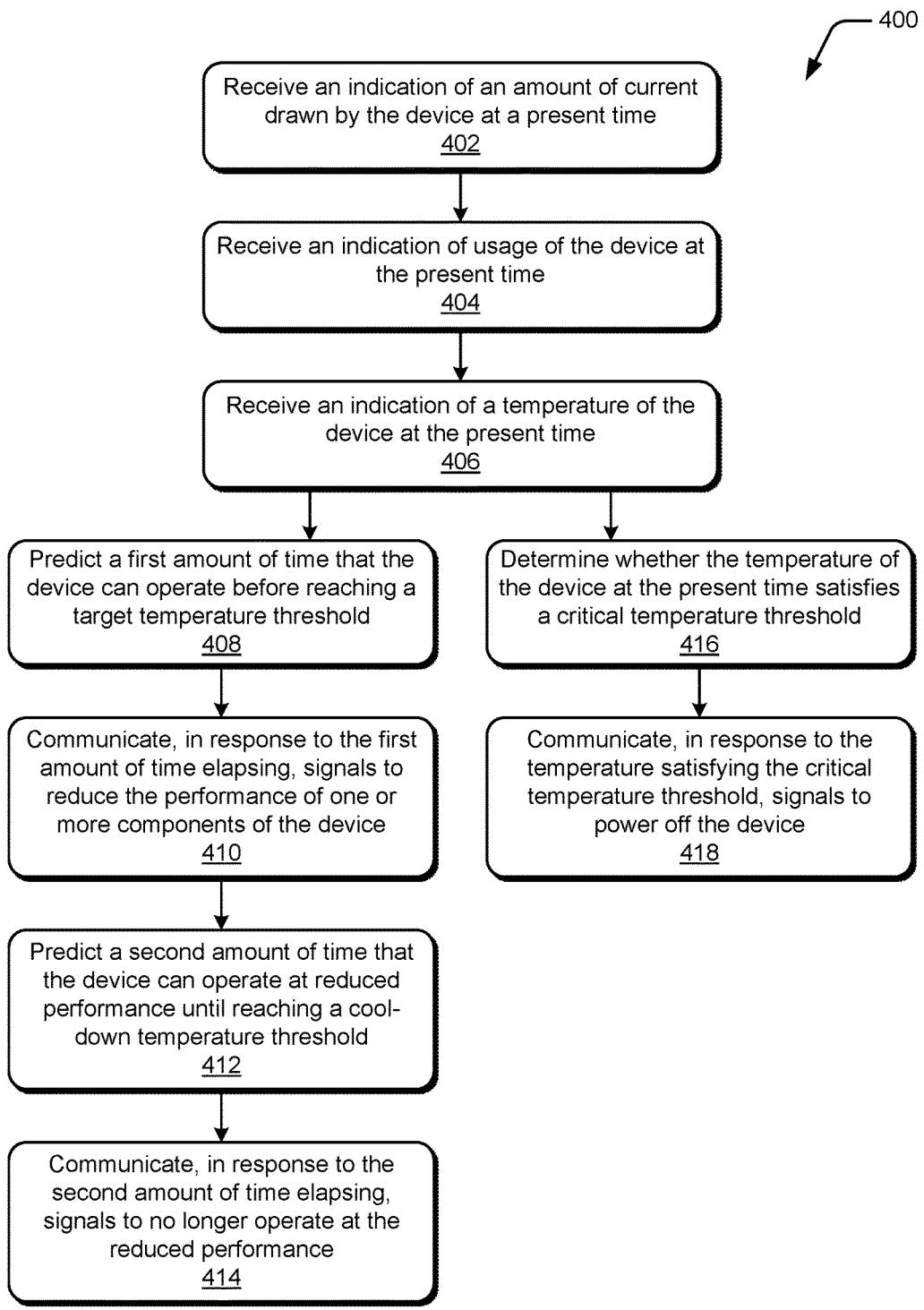
FIG. 4 illustrates an example process for implementing the techniques discussed herein in accordance with one or more embodiments.

FIG. 4 illustrates an example process 400 for implementing the techniques discussed herein in accordance with one or more embodiments. Process 400 is carried out by a thermal mitigation system, such as a thermal mitigation system 122 of FIG. 1 or FIG. 2, and can be implemented in software, firmware, hardware, or combinations thereof. Process 400 is shown as a set of acts and is not limited to the order shown for performing the operations of the various acts.

In process 400, an indication of an amount of current drawn by the device at a present time is received (act 402). This indication is received, for example, from a current sensor in the device.

An indication of usage of the device at the present time is also received (act 404). This indication is received, for example, from an operating system or application of the device. The device usage can include various information, such as the applications running on the device, the frequency of the processor on the device, a rate that a battery of the device is being charged, a data transfer rate with a cell tower, and so forth.

An indication of a temperature of the device at the present time is also received (act 404). This indication is received, for example, from one or more thermal sensors of the device. The temperature can be the temperature of a particular one or more components of the device, the temperature of the external surface of the device, combinations thereof, and so forth.

A first amount of time that the device can operate before reaching a target temperature threshold is predicted (act 408). This prediction is based on the amount of current drawn by the device at the present time and the usage of the device at the present time, and optionally temperature of the device at the present time.

Thermal mitigation is performed by communicating, in response to the first amount of time elapsing, performance control signals to one or more components of the device to reduce performance of the one or more components (act 410). This reduction in performance can take various forms, such as reducing the frequency of the processor on the device, reducing a rate that a battery of the device is being charged, reducing a data transfer rate with a cell tower, and so forth.

A second amount of time that the device can operate with the one or more components at reduced performance until reaching a cool-down temperature threshold is also predicted (act 412). This prediction is based on the amount of current drawn by the device at the present time and the usage of the device at the present time, and optionally temperature of the device at the present time.

In response to the second amount of time elapsing, performance control signals are communicated to the one or more components to no longer operate at the reduced performance (act 414). These performance control signals can indicate, for example, for the one or more components to return to the performance they had prior to changing to reduced performance in response to the performance control signals communicated in at 410.

Additionally, a determination is made whether the temperature of the device at the present time satisfies a critical temperature threshold (act 416). This critical temperature threshold is a temperature that is not to be exceeded, such as to avoid damage to the device.

In response to temperature of the device satisfying the critical temperature threshold, performance control signals are communicated to power off the device (act 418). The device can be powered off, for example, by power source control circuitry ceasing providing power to the other components of the device. The power source control circuitry can optionally be configured to keep the device powered off for a particular duration of time (e.g., one or two minutes) to prevent the device from being started while still too hot.

Figure 5:
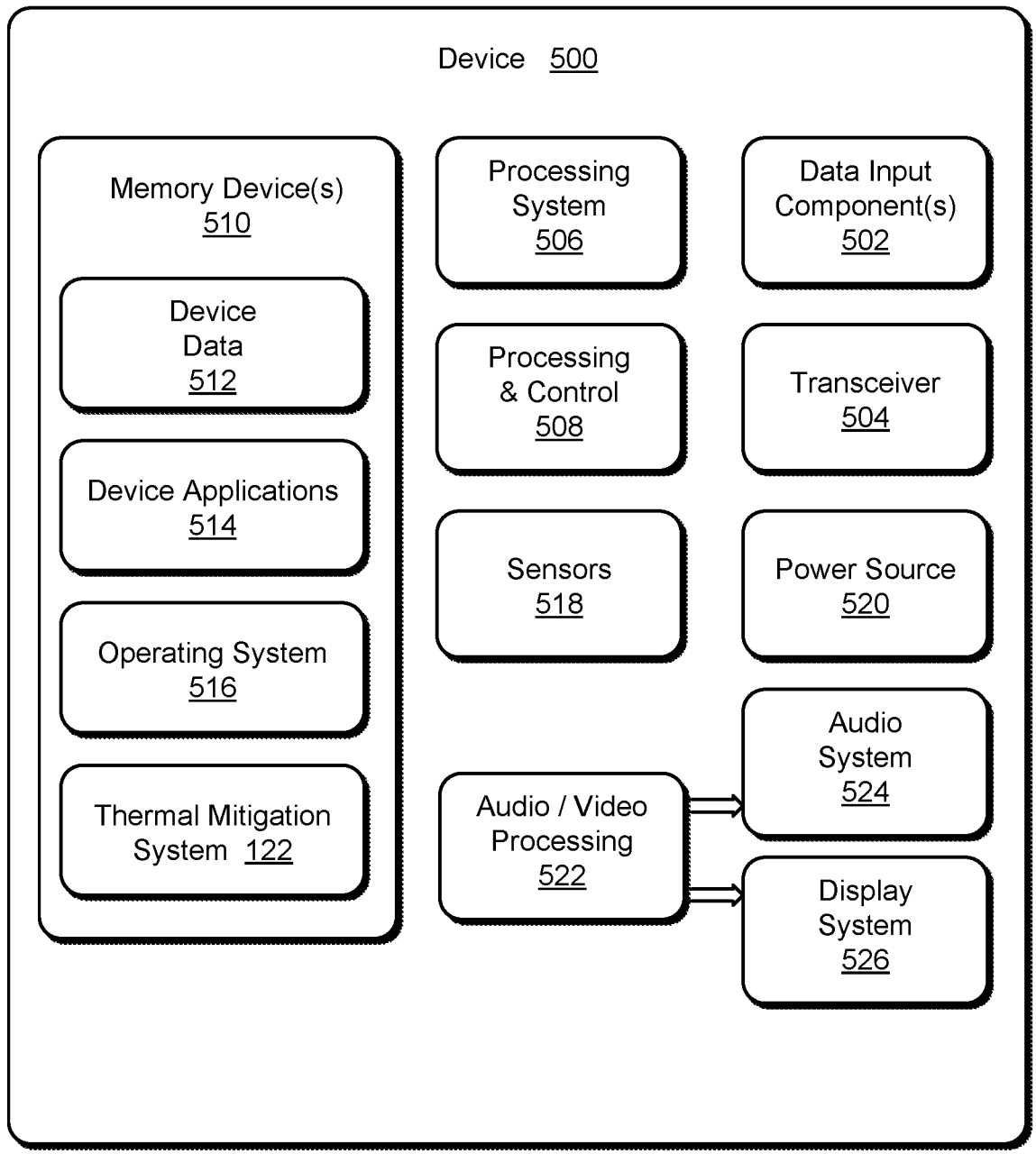
FIG. 5 illustrates various components of an example electronic device that can implement embodiments of the techniques discussed herein.

FIG. 5 illustrates various components of an example electronic device in which embodiments of time-based and temperature-based device thermal mitigation can be implemented. The electronic device 500 can be implemented as any of the devices described with reference to the previous FIG.s, such as any type of client device, mobile phone, tablet, computing, communication, entertainment, gaming, media playback, or other type of electronic device. In one or more embodiments the electronic device 500 includes the thermal mitigation system 122, described above.

The electronic device 500 includes one or more data input components 502 via which any type of data, media content, or inputs can be received such as user-selectable inputs, messages, music, television content, recorded video content, and any other type of text, audio, video, or image data received from any content or data source. The data input components 502 may include various data input ports such as universal serial bus ports, coaxial cable ports, and other serial or parallel connectors (including internal connectors) for flash memory, DVDs, compact discs, and the like. These data input ports may be used to couple the electronic device to components, peripherals, or accessories such as keyboards, microphones, or cameras. The data input components 502 may also include various other input components such as microphones, touch sensors, touchscreens, keyboards, and so forth.

The device 500 includes communication transceivers 504 that enable one or both of wired and wireless communication of device data with other devices. The device data can include any type of text, audio, video, image data, or combinations thereof. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, wired local area network (LAN) Ethernet transceivers for network data communication, and cellular networks (e.g., third generation networks, fourth generation networks such as LTE networks, or fifth generation networks).

The device 500 includes a processing system 506 of one or more processors (e.g., any of microprocessors, controllers, and the like) or a processor and memory system implemented as a system-on-chip (SoC) that processes computer-executable instructions. The processing system 506 may be implemented at least partially in hardware, which can include components of an integrated circuit or on-chip system, an application-specific integrated circuit (ASIC), a field-programmable gate array (FPGA), a complex programmable logic device (CPLD), and other implementations in silicon or other hardware.

Alternately or in addition, the device can be implemented with any one or combination of software, hardware, firmware, or fixed logic circuitry that is implemented in connection with processing and control circuits, which are generally identified at 508. The device 500 may further include any type of a system bus or other data and command transfer system that couples the various components within the device. A system bus can include any one or combination of different bus structures and architectures, as well as control and data lines.

The device 500 also includes computer-readable storage memory devices 510 that enable data storage, such as data storage devices that can be accessed by a computing device, and that provide persistent storage of data and executable instructions (e.g., software applications, programs, functions, and the like). Examples of the computer-readable storage memory devices 510 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 500 may also include a mass storage media device.

The computer-readable storage memory device 510 provides data storage mechanisms to store the device data 512, other types of information or data, and various device applications 514 (e.g., software applications). For example, an operating system 516 can be maintained as software instructions with a memory device and executed by the processing system 506. The device applications 514 may also include a device manager, such as any form of a control application, software application, signal-processing and control module, code that is native to a particular device, a hardware abstraction layer for a particular device, and so on.

The device 500 can also include one or more device sensors 518, such as any one or more of an ambient light sensor, a proximity sensor, a touch sensor, an infrared (IR) sensor, an accelerometer, a gyroscope, a thermal sensor, a current sensor, an audio sensor (e.g., microphone), and the like. The device 500 can also include one or more power sources 520, such as when the device 500 is implemented as a mobile device. The power sources 520 may include a charging or power system, and can be implemented as a flexible strip battery, a rechargeable battery, a charged super-capacitor, or any other type of active or passive power source.

The device 500 additionally includes an audio or video processing system 522 that generates one or both of audio data for an audio system 524 and display data for a display system 526. In accordance with some embodiments, the audio/video processing system 522 is configured to receive call audio data from the transceiver 504 and communicate the call audio data to the audio system 524 for playback at the device 500. The audio system or the display system may include any devices that process, display, or otherwise render audio, video, display, or image data. Display data and audio signals can be communicated to an audio component or to a display component, respectively, via an RF (radio frequency) link, S-video link, HDMI (high-definition multimedia interface), composite video link, component video link, DVI (digital video interface), analog audio connection, or other similar communication link. In implementations, the audio system or the display system are integrated components of the example device. Alternatively, the audio system or the display system are external, peripheral components to the example device.

Although embodiments of techniques for time-based and temperature-based device thermal mitigation have been described in language specific to features or methods, the subject of the appended claims is not necessarily limited to the specific features or methods described. Rather, the specific features and methods are disclosed as example implementations of techniques for implementing time-based and temperature-based device thermal mitigation. Further, various different embodiments are described, and it is to be appreciated that each described embodiment can be implemented independently or in connection with one or more other described embodiments. Additional aspects of the techniques, features, or methods discussed herein relate to one or more of the following:

A method implemented in a device, the method comprising: receiving an indication of an amount of current drawn by the device at a present time; receiving an indication of usage of the device at the present time; receiving an indication of a temperature of the device at the present time; predicting, based on the amount of current drawn by the device at the present time and the usage of the device at the present time, a first amount of time that the device can operate before reaching a target temperature threshold; determining whether the temperature of the device at the present time satisfies a critical temperature threshold; and performing thermal mitigation in the device by: communicating, in response to the first amount of time elapsing, performance control signals to one or more components of the device to reduce performance of the one or more components, and communicating, in response to temperature of the device satisfying the critical temperature threshold, performance control signals to power off the device.

Alternatively or in addition to the above described method, any one or combination of the following. The method further comprising: predicting, based on the amount of current drawn by the device at the present time and the usage of the device at the present time, a second amount of time that the device can operate with the one or more components at reduced performance until reaching a cool-down temperature threshold; and communicating, in response to the second amount of time elapsing, performance control signals to the one or more components to no longer operate at the reduced performance. The communicating performance control signals to the one or more components to no longer operate at the reduced performance including communicating to the one or more components an indication of the performance settings or levels the one or more components had prior to operating at the reduced performance. The method further comprising reducing a frequency of determining whether the temperature of the device at the present time satisfies the critical temperature while predicting the first amount of time or the second amount of time. The temperature of the device comprising the temperature of an external surface of the device. The predicting the first amount of time comprising predicting the first amount of time in response to an asymptote ramp threshold being satisfied, the asymptote ramp threshold corresponding to a point at which a line formed by connecting by connecting a plot of temperatures over time has an angle less than a particular number of degrees. The communicating performance control signals to one or more components of the device to reduce performance of the one or more components comprising communicating an indication to a communication system to signal to a cell tower to reduce a data transfer rate between the cell tower and the device. The communicating performance control signals to one or more components of the device to reduce performance of the one or more components comprising communicating an indication to a processor of the device to reduce frequency. The communicating performance control signals to one or more components of the device to reduce performance of the one or more components comprising communicating an indication to charging system to reduce a rate of charging a power source of the device. The method further comprising: receiving an indication of a size of a file being downloaded and a first data transfer rate to be used to download the file; determining, based on the size of the file and the data transfer rate, how quickly the device will heat up while downloading portions of the file at the first data transfer rate, and how quickly the device will cool down while downloading portions at a second data transfer rate; predicting, based on the determined how quickly the device will heat up and how quickly the device will cool down, when the device is to download portions of the file at the first data transfer rate and when the device is to download portions of the file at the second data transfer rate; and communicating, during downloading of the file, performance control signals to a communication system of the device indicating when to download portions of the file at the first data transfer rate and when to download portions of the file at the second data transfer rate.

A computing device comprising: a processor implemented in hardware; a current sensor to detect an amount of current drawn by the computing device; an operating system; a thermal sensor; and a computer-readable storage medium having stored thereon multiple instructions that, responsive to execution by the processor, cause the processor to perform acts including: receiving, from the current sensor, an indication of the amount of current drawn by the computing device at a present time; receiving, from the operating system, an indication of usage of the computing device at the present time; receiving, from the thermal sensor, an indication of a temperature of the computing device at the present time; predicting, based on the amount of current drawn by the computing device at the present time and the usage of the computing device at the present time, a first amount of time that the computing device can operate before reaching a target temperature threshold; determining whether the temperature of the computing device at the present time satisfies a critical temperature threshold; and performing thermal mitigation in the computing device by: communicating, in response to the first amount of time elapsing, performance control signals to one or more components of the computing device to reduce performance of the one or more components, and communicating, in response to temperature of the computing device satisfying the critical temperature threshold, performance control signals to power off the computing device.

Alternatively or in addition to the above described computing device, any one or combination of the following. The acts further comprising: predicting, based on the amount of current drawn by the computing device at the present time and the usage of the computing device at the present time, a second amount of time that the computing device can operate with the one or more components at reduced performance until reaching a cool-down temperature threshold; and communicating, in response to the second amount of time elapsing, performance control signals to the one or more components to no longer operate at the reduced performance. The communicating performance control signals to the one or more components to no longer operate at the reduced performance including communicating to the one or more components an indication of the performance settings or levels the one or more components had prior to operating at the reduced performance. The predicting the first amount of time comprising predicting the first amount of time in response to an asymptote ramp threshold being satisfied, the asymptote ramp threshold corresponding to a point at which a line formed by connecting by connecting a plot of temperatures from the thermal sensor over time has an angle less than a particular number of degrees. The temperature of the computing device comprising the temperature of an external surface of the computing device.

A system comprising: a processor implemented in hardware; a current sensor to detect an amount of current drawn by the system; an operating system; a thermal sensor; a time-based thermal mitigation module, implemented at least in part in hardware, configured to receive from the current sensor an indication of the amount of current drawn by the system at a present time, receive from the operating system an indication of usage of the system at the present time, predict, based on the amount of current drawn by the computing device at the present time and the usage of the computing device at the present time, a first amount of time that the computing device can operate before reaching a target temperature threshold, and perform thermal mitigation in the system by communicating, in response to the first amount of time elapsing, performance control signals to one or more components of the system to reduce performance of the one or more components; and a temperature-based thermal mitigation module, implemented at least in part in hardware, configured to receive from the thermal sensor an indication of a temperature of the system at the present time, determine whether the temperature of the system at the present time satisfies a critical temperature threshold, and perform thermal mitigation in the computing device by communicating, in response to temperature of the computing device satisfying the critical temperature threshold, performance control signals to power off the computing device.

Alternatively or in addition to the above described system, any one or combination of the following. The time-based thermal mitigation module being further to predict, based on the amount of current drawn by the system at the present time and the usage of the system at the present time, a second amount of time that the system can operate with the one or more components at reduced performance until reaching a cool-down temperature threshold, and communicate, in response to the second amount of time elapsing, performance control signals to the one or more components to no longer operate at the reduced performance. The communicating performance control signals to the one or more components to no longer operate at the reduced performance including communicating to the one or more components an indication of the performance settings or levels the one or more components had prior to operating at the reduced performance. The temperature-based thermal mitigation module being further configured to reduce a frequency of determining whether the temperature of the system at the present time satisfies the critical temperature while the time-based thermal mitigation is predicting the first amount of time. The communicating performance control signals to one or more components of the device to reduce performance of the one or more components comprising communicating an indication to a communication system to signal to a cell tower to reduce a data transfer rate between the cell tower and the device.

What is claimed is:

1. A method implemented in a device, the method comprising:
    receiving an indication of a detected amount of current drawn by the device at a present time;
    receiving an indication of usage of the device at the present time;
    receiving an indication of a temperature of the device at the present time;
    predicting, based on the amount of current drawn by the device at the present time and the usage of the device at the present time, a first amount of time that the device can operate before reaching a target temperature threshold;
    determining whether the temperature of the device at the present time satisfies a critical temperature threshold; and
    performing thermal mitigation in the device by:
        communicating, in response to the predicted first amount of time elapsing, performance control signals to one or more components of the device to reduce performance of the one or more components; and
        communicating, in response to temperature of the device satisfying the critical temperature threshold, performance control signals to power off the device.

2. The method as recited in claim 1, further comprising:
    predicting, based on the amount of current drawn by the device at the present time and the usage of the device at the present time, a second amount of time that the device can operate with the one or more components at reduced performance until reaching a cool-down temperature threshold; and
    communicating, in response to the second amount of time elapsing, performance control signals to the one or more components to no longer operate at the reduced performance.

3. The method as recited in claim 2, the communicating performance control signals to the one or more components to no longer operate at the reduced performance including communicating to the one or more components an indication of performance settings or levels the one or more components had prior to operating at the reduced performance.

4. The method as recited in claim 2, further comprising reducing a frequency of determining whether the temperature of the device at the present time satisfies the critical temperature while predicting the first amount of time or the second amount of time.

5. The method as recited in claim 1, the temperature of the device comprising the temperature of an external surface of the device.

6. The method as recited in claim 1, the predicting the first amount of time comprising predicting the first amount of time in response to an asymptote ramp threshold being satisfied, the asymptote ramp threshold corresponding to a point at which a line formed by connecting by connecting a plot of temperatures over time has an angle less than a particular number of degrees.

7. The method as recited in claim 1, the communicating performance control signals to one or more components of the device to reduce performance of the one or more components comprising communicating an indication to a communication system to signal to a cell tower to reduce a data transfer rate between the cell tower and the device.

8. The method as recited in claim 1, the communicating performance control signals to one or more components of the device to reduce performance of the one or more components comprising communicating an indication to a processor of the device to reduce frequency.

9. The method as recited in claim 1, the communicating performance control signals to one or more components of the device to reduce performance of the one or more components comprising communicating an indication to charging system to reduce a rate of charging a power source of the device.

10. The method as recited in claim 1, further comprising:
    receiving an indication of a size of a file being downloaded and a first data transfer rate to be used to download the file;
    determining, based on the size of the file and the data transfer rate, how quickly the device will heat up while downloading portions of the file at the first data transfer rate, and how quickly the device will cool down while downloading portions at a second data transfer rate;

predicting, based on the determined how quickly the device will heat up and how quickly the device will cool down, when the device is to download portions of the file at the first data transfer rate and when the device is to download portions of the file at the second data transfer rate; and communicating, during downloading of the file, performance control signals to a communication system of the device indicating when to download portions of the file at the first data transfer rate and when to download portions of the file at the second data transfer rate.

11. A computing device comprising:
a processor implemented in hardware;
a current sensor to detect an amount of current drawn by the computing device;
an operating system;
a thermal sensor; and
a computer-readable storage medium having stored thereon multiple instructions that, responsive to execution by the processor, cause the processor to perform acts including:
receiving, from the current sensor, an indication of the detected amount of current drawn by the computing device at a present time;
receiving, from the operating system, an indication of usage of the computing device at the present time;
receiving, from the thermal sensor, an indication of a temperature of the computing device at the present time;
predicting, based on the amount of current drawn by the computing device at the present time and the usage of the computing device at the present time, a first amount of time that the computing device can operate before reaching a target temperature threshold;
determining whether the temperature of the computing device at the present time satisfies a critical temperature threshold; and
performing thermal mitigation in the computing device by:
communicating, in response to the predicted first amount of time elapsing, performance control signals to one or more components of the computing device to reduce performance of the one or more components; and
communicating, in response to temperature of the computing device satisfying the critical temperature threshold, performance control signals to power off the computing device.

12. The computing device as recited in claim 11, the acts further comprising:
predicting, based on the amount of current drawn by the computing device at the present time and the usage of the computing device at the present time, a second amount of time that the computing device can operate with the one or more components at reduced performance until reaching a cool-down temperature threshold; and
communicating, in response to the second amount of time elapsing, performance control signals to the one or more components to no longer operate at the reduced performance.

13. The computing device as recited in claim 12, the communicating performance control signals to the one or more components to no longer operate at the reduced performance including communicating to the one or more components an indication of performance settings or levels the one or more components had prior to operating at the reduced performance.

14. The computing device as recited in claim 11, the predicting the first amount of time comprising predicting the first amount of time in response to an asymptote ramp threshold being satisfied, the asymptote ramp threshold corresponding to a point at which a line formed by connecting by connecting a plot of temperatures from the thermal sensor over time has an angle less than a particular number of degrees.

15. A system comprising:
a processor implemented in hardware;
a current sensor to detect an amount of current drawn by the system;
an operating system;
a thermal sensor;
a time-based thermal mitigation module, implemented at least in part in hardware, configured to receive from the current sensor an indication of the detected amount of current drawn by the system at a present time, receive from the operating system an indication of usage of the system at the present time, predict, based on the amount of current drawn by the system at the present time and the usage of the system at the present time, a first amount of time that the system can operate before reaching a target temperature threshold, and perform thermal mitigation in the system by communicating, in response to the predicted first amount of time elapsing, performance control signals to one or more components of the system to reduce performance of the one or more components; and
a temperature-based thermal mitigation module, implemented at least in part in hardware, configured to receive from the thermal sensor an indication of a temperature of the system at the present time, determine whether the temperature of the system at the present time satisfies a critical temperature threshold, and perform thermal mitigation in the system by communicating, in response to temperature of the system satisfying the critical temperature threshold, performance control signals to power off the system.

16. The system as recited in claim 15, the time-based thermal mitigation module being further to predict, based on the amount of current drawn by the system at the present time and the usage of the system at the present time, a second amount of time that the system can operate with the one or more components at reduced performance until reaching a cool-down temperature threshold, and communicate, in response to the second amount of time elapsing, performance control signals to the one or more components to no longer operate at the reduced performance.

17. The system as recited in claim 16, the communicating performance control signals to the one or more components to no longer operate at the reduced performance including communicating to the one or more components an indication of performance settings or levels the one or more components had prior to operating at the reduced performance.

18. The system as recited in claim 15, the temperature-based thermal mitigation module being further configured to reduce a frequency of determining whether the temperature of the system at the present time satisfies the critical temperature while the time-based thermal mitigation is predicting the first amount of time.

19. The system as recited in claim 15, the communicating performance control signals to one or more components of the system to reduce performance of the one or more components comprising communicating an indication to a communication system to signal to a cell tower to reduce a data transfer rate between the cell tower and the system.

20. The method as recited in claim 1, the predicting the first amount of time being further based on the amount of current drawn by the device at the present time remaining approximately at a same current and the usage of the device at the present time remaining approximately at a same usage.

* * * * *